UNITED STATES PATENT OFFICE.

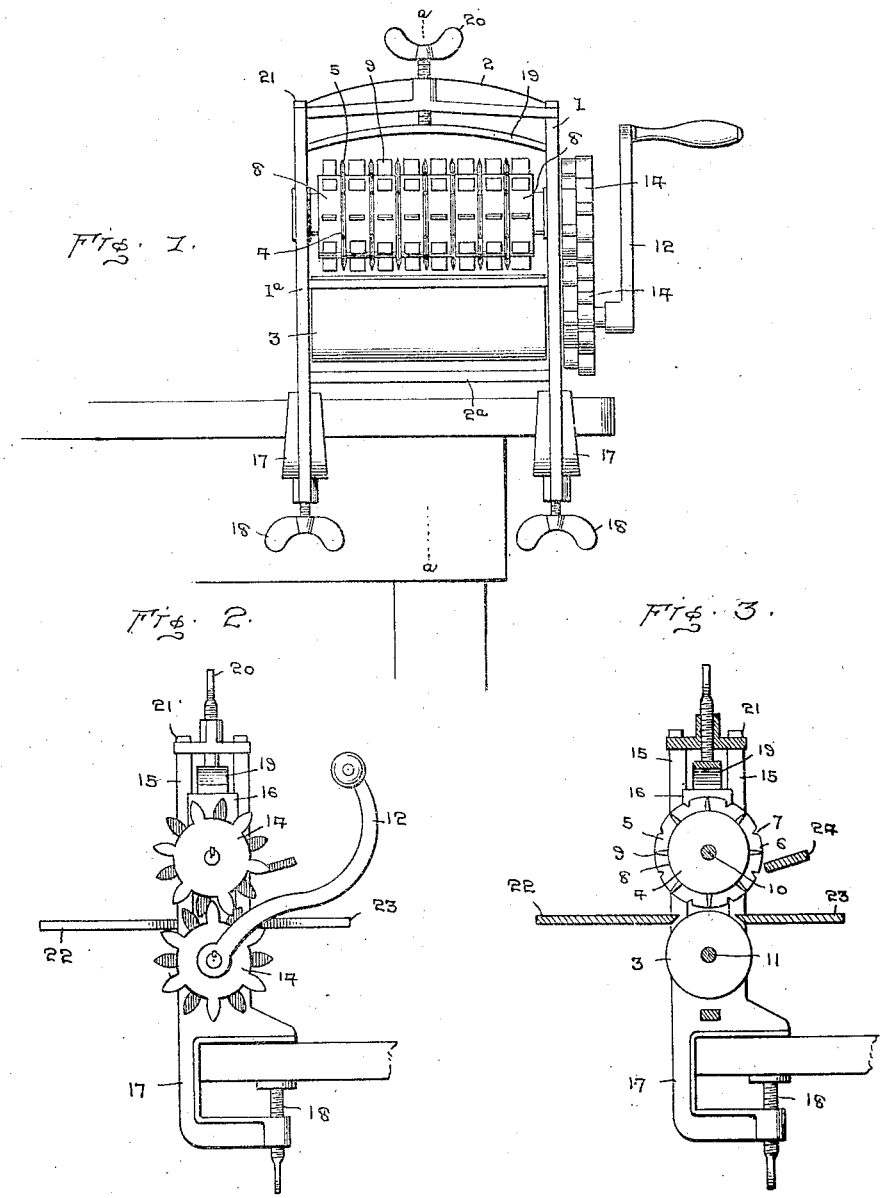

JOHN P. BERGSTROM, OF RHINELANDER, WISCONSIN.

MEAT-TENDERER.

Specification of Letters Patent. Patented Jan. 26, 1915.

Application filed June 17, 1914. Serial No. 845,638.

*To all whom it may concern:*

Be it known that I, JOHN P. BERGSTROM, a citizen of the United States, residing at Rhinelander, in the county of Oneida and State of Wisconsin, have invented certain new and useful Improvements in Meat-Tenderers; and I do hereby declare the following to be a full, clear, and exact description of the invention, such as will enable others skilled in the art to which it appertains to make and use the same.

My invention refers to meat tenderers.

The object of my invention is to provide a means for rendering meat, especially beef steak, tender and palatable, and yet leaving the steak in practically its normal shape and is not to be confounded with a meat grinder.

In the drawings herewith which are made a part of this application Figure 1 is a front elevation of the tenderer attached to the edge of the table. Fig. 2 is an end view showing the cog-gearing, and Fig. 3 is a vertical sectional view on the line $a-a$ Fig. 1.

In the detailed description numerals will be used to indicate the various parts, the same numeral indicating the same part throughout the several views.

In materializing my invention the elements consisting of a frame, two rollers contained within the frame and means for rotatively connecting the two rollers and also means for removably fastening the frame to a table or other support are used. A detailed description of the construction and combination of parts follows.

A frame consisting of two upright side pieces 1 and 1ª and two cross pieces 2 and 2ª is utilized to form a support for the smooth or under roller 3 and the upper roller 4 which is a complex structure and is composed of a plurality of parts mounted upon a central shaft. A plurality of disks 5 having a sharp cutting edge 6 and a plurality of notches 7 cut at regular intervals in said edge mounted alternately with a smooth disk 8 of smaller diameter and greater thickness having a plurality of cutting blades 9 inserted across the circumferential face thereof parallel to the bore formed to fit the said shaft, the length of the cutting blade being less than the thickness of the disks. When constructing an upper roller 4, disk 8 is first placed upon the shaft 10 when disks 5 and 8 are alternately placed upon the shaft ending with a disk 8, the cutting blades on the disks 8 being positioned halfway between the notches in the disks 5 in alinement, the notches also being kept in alinement when assembling the disks to form roller 4. This combination of disks is then held firmly in place by two nuts being run on the shaft which is threaded near each end to receive the nuts, the disks may be easily and quickly removed for sharpening or repairs by removing one of the nuts after the shaft has been removed from the frame. The above described arrangement of the disks and cutting blades form a roller that will make short disconnected cuts both longitudinal and transverse and leave uncut portions between the cuts, leaving the steak in practically its original shape, it not being designed to macerate the steak. The lower roller 3 is also mounted on a shaft 11 which has an extended end, past the bearing of the shaft on which a crank 12 is mounted, cog-gearing 14 is also mounted on one end of the shaft of both rollers outside of the frame, for the purpose of rotatively connecting the two rollers.

The two side pieces of the frame are of metal bifurcated at their upper portions 15, between the forks of which are slidably positioned the boxing 16 carrying the bearings of the journals of the shaft of the two rollers and at the lower ends of said side pieces cast integrally therewith are located clamps 17 provided with screw threaded bolts 18 having winged heads, said bolts operating in a threaded opening in said clamps, thus supplying a means for fastening the tenderer to a table or similar support.

Resting between two parts of the bifurcated ends 15 of the two side pieces and on top of the boxings, are the ends of a tension spring 19. The tension of said spring 19 is regulated by a threaded bolt having a winged head (or a thumb screw) 20 passing through a threaded orifice in the center of the top cross-piece 2 which is of cast metal formed thicker in its center portion and having a rib cast along its top surface at right angles to the plane thereof for the purpose of adding strength to the casting. By means of said spring the operative space between the rollers is controlled. The extreme ends of the bifurcated portions of the said members terminate in threaded portions which pass through openings in the ends of the top cross-piece 2 and are provided with nuts 21 which hold the top and side pieces in fixed relation to each other. The ends of the bottom cross-piece 2ª are reduced forming a shoulder thereon and the reduced portion is threaded and provided with a nut. The shoulder rests against the inside portion of the side pieces, the reduced portion extending therethrough and the nuts being run on the threaded portion, hold the sides in fixed parallel relation to each other, and add rigidity to the frame.

On either side of the frame at a point slightly below the top of the lower roller 3 two metal shelves 22 and 23 extending at right angles to the frame and parallel with the surface of the rollers, are placed to receive and support the steak while being run between the rollers. A third metal shelf 24 is also attached to the frame on the front side thereof and above the before mentioned shelf 23 for the convenience of the operator.

The entire structure being composed of metal can readily be cleaned and kept in a sanitary condition.

In operation the tenderer having been fastened to a table by the clamps, the steak is placed upon one of the shelves and the crank is turned to rotate the rollers, the steak is then placed so that it will pass between the rollers, the sharp edges of the cutting members on the top roller cutting short gashes in the steak but not entirely severing the portions. The steak may be run through backward and forward as frequently as may be necessary to reduce the steak to the required condition, thus quickly and much more effectively accomplishing the result aimed at by pounding the steak as is common practice.

From the foregoing description it is believed that the construction, advantages and manner of using my invention have been made clearly apparent, and that further description is deemed unnecessary.

What I wish to secure by Letters Patent is:

In a meat tenderer, a cutting roller comprising a plurality of disks having sharp cutting edges, the said edges having a plurality of notches at regular intervals therein, a plurality of smooth disks of less diameter and greater thickness and having cutting blades across the face thereof, and of less length than the width of the said disks, the said disks being alternately assembled upon a shaft, whereby longitudinal and transverse disconnected cuts are made.

In testimony whereof I have signed my name to this specification in the presence of two subscribing witnesses.

JOHN P. BERGSTROM.

Witnesses:
CHAS. B. PETERSON,
ANDREW C. DANIELSON.